United States Patent
Sohtell

(10) Patent No.: US 12,352,872 B2
(45) Date of Patent: Jul. 8, 2025

(54) POSITIONING WITH GNSS AND RADAR DATA

(71) Applicant: Navico, Inc., Tulsa, OK (US)

(72) Inventor: Gustav Sohtell, Gothenburg (SE)

(73) Assignee: Navico, Inc., Tulsa, OK (US)

( * ) Notice: Subject to any disclaimer, the term of this patent is extended or adjusted under 35 U.S.C. 154(b) by 245 days.

(21) Appl. No.: 18/296,674

(22) Filed: Apr. 6, 2023

(65) Prior Publication Data

US 2024/0337761 A1    Oct. 10, 2024

(51) Int. Cl.
| | |
|---|---|
| *G01S 19/46* | (2010.01) |
| *B63B 79/40* | (2020.01) |
| *G01S 13/937* | (2020.01) |
| *G01S 19/39* | (2010.01) |
| *G05D 1/00* | (2024.01) |

(52) U.S. Cl.
CPC .............. *G01S 19/46* (2013.01); *B63B 79/40* (2020.01); *G01S 19/393* (2019.08); *G05D 1/0206* (2013.01); *B63B 2213/02* (2013.01); *G01S 13/937* (2020.01)

(58) Field of Classification Search
CPC ...... G01S 19/46; G01S 19/393; G01S 13/937; G01S 15/89; B63B 79/40; B63B 2213/02; G05D 1/0206
USPC .......................................................... 701/21
See application file for complete search history.

(56) References Cited

U.S. PATENT DOCUMENTS

| | | | |
|---|---|---|---|
| 2012/0044104 A1* | 2/2012 | Schloetzer ............ | G01S 13/878 342/357.29 |
| 2012/0072059 A1* | 3/2012 | Glaeser ................... | G08G 3/00 701/21 |
| 2015/0054674 A1* | 2/2015 | Ballou ................... | G01S 13/937 342/41 |
| 2019/0265350 A1* | 8/2019 | Hawker ............. | G01C 21/1652 |
| 2020/0150677 A1* | 5/2020 | Walters ................ | G05D 1/0206 |
| 2021/0190899 A1* | 6/2021 | Bolduc ................. | G01S 7/4972 |
| 2022/0214689 A1* | 7/2022 | Pavlica ................... | B63B 79/40 |
| 2022/0392211 A1* | 12/2022 | Johnson ................ | G06V 10/26 |
| 2023/0184925 A1* | 6/2023 | Fonts .................... | G01S 13/885 342/127 |

(Continued)

OTHER PUBLICATIONS

"GNSS reflectometry;" Wikipedia; retrieved Aug. 11, 2023 from https://en.wikipedia.org/wiki/GNSS_reflectometry.

(Continued)

*Primary Examiner* — Krishnan Ramesh
(74) *Attorney, Agent, or Firm* — Nelson Mullins Riley & Scarborough LLP

(57) ABSTRACT

A method for refining global navigation satellite system (GNSS) data for a watercraft is provided. The method includes receiving, from a global navigation satellite system (GNSS) mounted to the watercraft, the GNSS data. The method also includes receiving radar data from a radar mounted to the watercraft, creating adjusted data using at least the radar data and the GNSS data, and applying the adjusted data by taking an action. The action comprises at least one of performing a docking operation with the adjusted data, automatically navigating the watercraft using the adjusted data, causing presentation of an alert or other indication regarding the adjusted data, or updating a chart to form an updated chart and causing presentation of the updated chart on a display.

16 Claims, 12 Drawing Sheets

(56) References Cited

U.S. PATENT DOCUMENTS

2023/0195118 A1* 6/2023 Singh .................... B63B 79/15
　　　　　　　　　　　　　　　　　　　　　　　　　701/21
2024/0140570 A1* 5/2024 Schiele ................. F03D 13/25

OTHER PUBLICATIONS

"What is SLAM (Simultaneous Localization and Mapping);" *GeoSLAM*; retrieved Aug. 11, 2023 from https://geoslam.com/us/what-is-slam/.

* cited by examiner

POSITIONING WITH GNSS AND RADAR DATA

FIELD OF THE INVENTION

Embodiments of the present invention relate generally to methods, systems, and computer program products for using radar data and global navigation satellite system (GNSS) data to form adjusted data having increased accuracy.

BACKGROUND OF THE INVENTION

GNSS data is often received at a GNSS receiver on a watercraft to obtain location information from a GNSS. GNSS data is often sufficient to provide a rough estimate of a watercraft location, but the GNSS data is often insufficient in applications where more accurate positioning is required. GNSS data also possesses a significant amount of jitter relative to data from radar devices, such as a radar device on a watercraft. The radar data generally possesses increased accuracy relative to GNSS data, but the radar data possesses limited range relative to the GNSS data.

BRIEF SUMMARY OF THE INVENTION

Various embodiments discussed herein determine the location and orientation of a watercraft with improved accuracy. This may be done by using radar data in combination with GNSS data to form adjusted data. In some embodiments, adjusted data may be formed by inputting GNSS data and radar data into a Kalman filter. In some embodiments, adjusted data may be formed by determining an offset between particular points represented in radar data and GNSS data and adjusting the data based on the offset. In some embodiments, chart data may also be used to form adjusted data.

By utilizing both GNSS data and radar data to form adjusted data, adjusted data may effectively be used for a wider array of applications. While GNSS data alone is often insufficient standing alone in applications where a high amount of accuracy is required, the radar data may help provide an improved amount of accuracy that allows adjusted data to be used in these applications. Furthermore, the use of radar data to form adjusted data is beneficial to reduce the amount of jitter in adjusted data relative to the amount of jitter in GNSS data alone. Additionally, while radar data alone often has a limited range that makes it less helpful in making navigational plans in distant locations, GNSS data may provide data for these distant locations, and the radar data may also provide increased accuracy for the adjusted data to reduce any large scale offsets in the adjusted data.

The use of adjusted data formed using GNSS data, radar data, and/or chart data are beneficial for various applications. For example, this adjusted data is beneficial in automatic docking operations where precision is required to avoid collisions with a dock. Where GNSS data is used standing alone, this GNSS data is often ineffective in automatic docking operations as the GNSS data possesses jitter which may cause sudden, unwanted movements in a watercraft. Another application where adjusted data is beneficial is in map overlays, where radar images are overlayed very accurately onto a chart. Adjusted data may also be utilized to make large adjustments to charts such as maps to shift the location of the watercraft representation on the charts relative to other features on the charts, and/or to alter the orientation or heading direction of the watercraft representation relative to other features on the chart, among many other beneficial features.

In an example embodiment, a method for refining global navigation satellite system (GNSS) data for a watercraft is provided. The method includes receiving, from a global navigation satellite system (GNSS) mounted to the watercraft, the GNSS data. The method also includes receiving radar data from a radar mounted to the watercraft, creating adjusted data using at least the radar data and the GNSS data, and applying the adjusted data by taking an action. The action comprises at least one of performing a docking operation with the adjusted data, automatically navigating the watercraft using the adjusted data, causing presentation of an alert or other indication regarding the adjusted data, or updating a chart to form an updated chart and causing presentation of the updated chart on a display.

In some embodiments, the adjusted data is created using a Kalman filter, with the GNSS data and the radar data used as inputs in the Kalman filter. Additionally, in some embodiments, the method also comprises receiving chart data, and the GNSS data, the radar data, and the chart data are used as inputs in the Kalman filter.

In some embodiments, the method also includes identifying an offset between the GNSS data and the radar data and adjusting the GNSS data based on the offset to form adjusted data. The offset includes at least one of a linear offset between the GNSS data and the radar data or a rotational offset between the GNSS data and the radar data. Additionally, in some embodiments, the adjusted data is formed by applying at least one of a linear adjustment value or a rotational adjustment value to the GNSS data. The linear adjustment value may be equal to the linear offset, and the rotational adjustment value may be equal to the rotational offset. Furthermore, in some embodiments, the method also includes identifying fixed GNSS data that represents a fixed object within the GNSS data and identifying fixed radar data that represents the fixed object within the radar data, and identifying an offset between the GNSS data and the radar data is accomplished by identifying an offset between the fixed GNSS data and the fixed radar data. In some embodiments, the method also comprises receiving additional radar data from the radar, identifying a second offset between the adjusted data and the additional radar data, and adjusting the adjusted data based on the second offset to form second adjusted data, and additional radar data is received after the radar data. Also, in some embodiments, the method also comprises receiving additional radar data from the radar, identifying a second offset between the GNSS data and the additional radar data, and adjusting the GNSS data based on the second offset to form second adjusted data. The second offset includes at least one of a linear offset between the GNSS data and the additional radar data or a rotational offset between the GNSS data and the additional radar data, and the additional radar data is received after the radar data. In some embodiments, the method also comprises receiving additional GNSS data from the global navigation satellite system (GNSS), receiving additional radar data from the radar, identifying a second offset between the additional GNSS data and the additional radar data, and adjusting the additional GNSS data based on the second offset to form second adjusted data. The second offset includes at least one of a linear offset between the additional GNSS data and the additional radar data or a rotational offset between the additional GNSS data and the additional radar data, the additional GNSS data is received after the GNSS data, and the additional radar data is received after the radar data.

In some embodiments, the method also includes receiving an anchor position for the watercraft, determining a navigational command based on the adjusted data, and causing the navigational command to be applied to shift the watercraft towards the anchor position. The navigational command includes at least one of a steering command to rotate the watercraft or a thrust command to generate thrust at a motor of the watercraft.

In some embodiments, adjusted data is formed repetitively as further radar data is received from the radar of the watercraft. Additionally, in some embodiments, adjusted data is formed at least once every ten seconds. In some embodiments, adjusted data is formed at least once every five seconds. Furthermore, in some embodiments, adjusted data is formed at least once every second.

In some embodiments, the radar is a Doppler radar. In some embodiments, the method comprises applying the adjusted data by performing an automated docking operation with the adjusted data.

In another example embodiment, a system for refining global navigation satellite system (GNSS) data for a watercraft is provided. The system comprises a radar, a global navigation satellite system (GNSS), a processor, and a memory. The memory includes computer program code configured to, when executed, cause the processor to receive, from the GNSS, the GNSS data, receive radar data from a radar mounted to the watercraft, create adjusted data using at least the radar data and the GNSS data, and apply the adjusted data by taking an action. The action comprises at least one of performing a docking operation with the adjusted data, automatically navigating the watercraft using the adjusted data, causing presentation of an alert or other indication regarding the adjusted data, or updating a chart to form an updated chart and causing presentation of the updated chart on a display. In some embodiments, the adjusted data is created using a Kalman filter, with the GNSS data and the radar data used as inputs in the Kalman filter.

In another example embodiment, a non-transitory computer readable medium having stored thereon software instructions is provided. When executed by a processor, the software instructions cause the processor to receive, from the global navigation satellite system (GNSS), the GNSS data, receive radar data from a radar mounted to the watercraft, create adjusted data using at least the radar data and the GNSS data, and apply the adjusted data by taking an action. The action comprises at least one of performing a docking operation with the adjusted data, automatically navigating the watercraft using the adjusted data, causing presentation of an alert or other indication regarding the adjusted data, or updating a chart to form an updated chart and causing presentation of the updated chart on a display. In some embodiments, the adjusted data is created using a Kalman filter, with the GNSS data and the radar data used as inputs in the Kalman filter.

BRIEF DESCRIPTION OF THE DRAWINGS

Figure 1A:
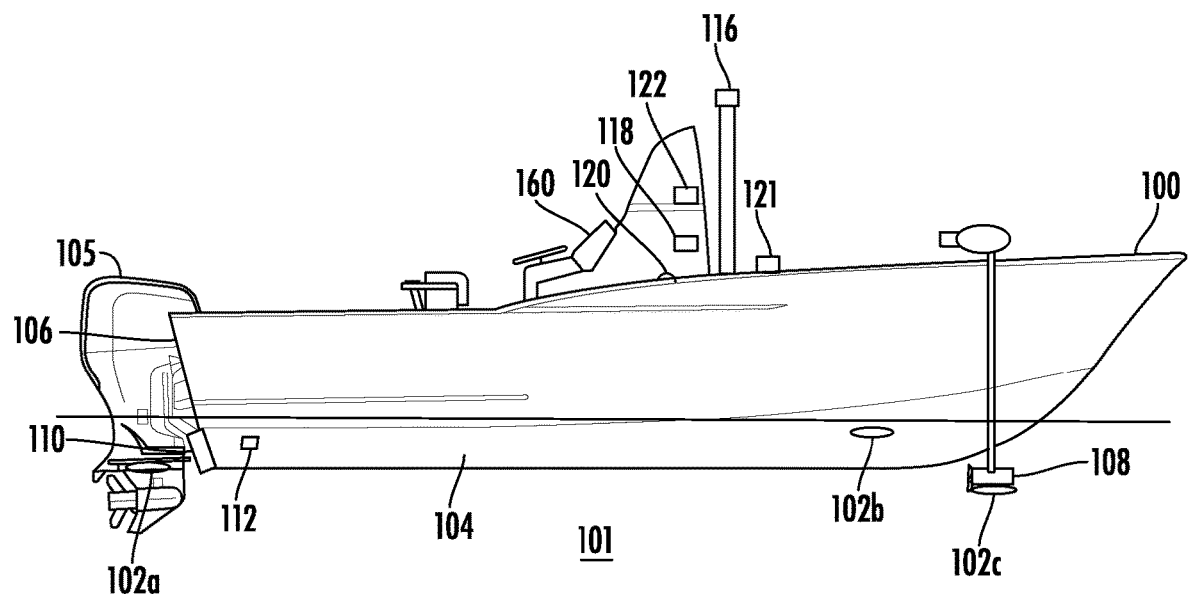
Figure 1B:
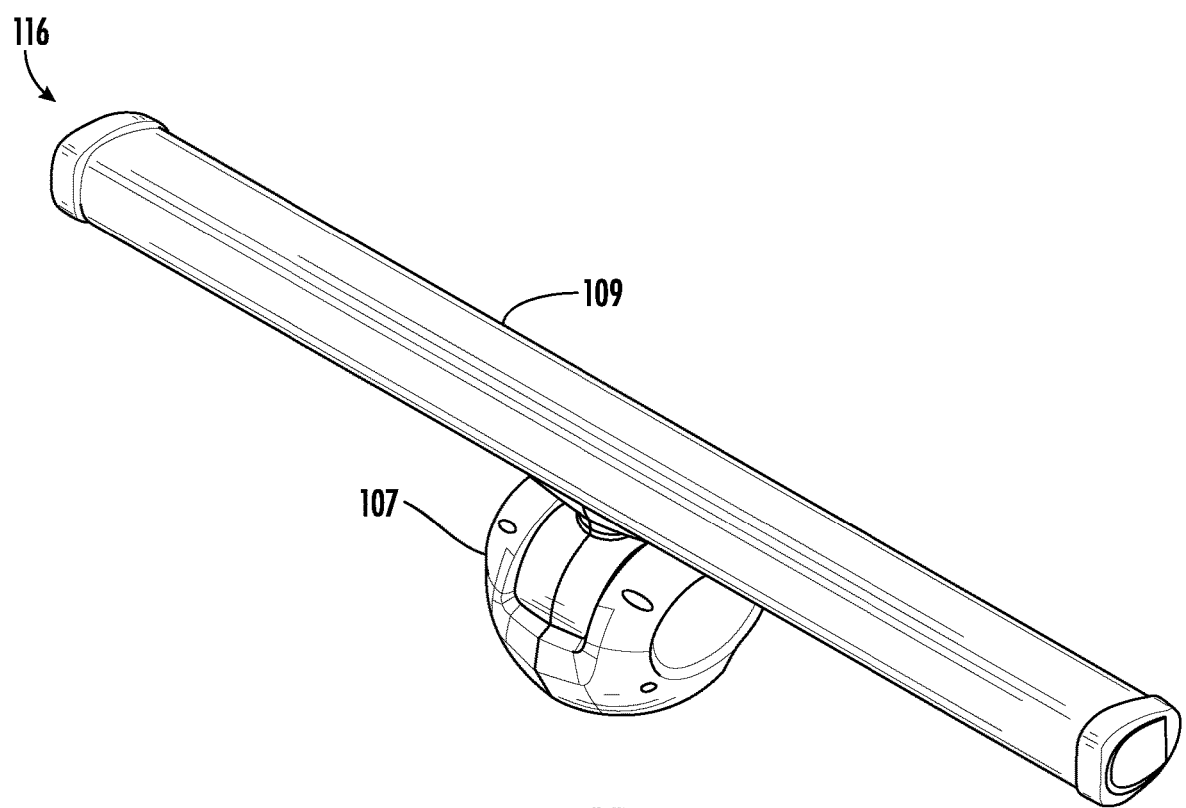
Figure 2:
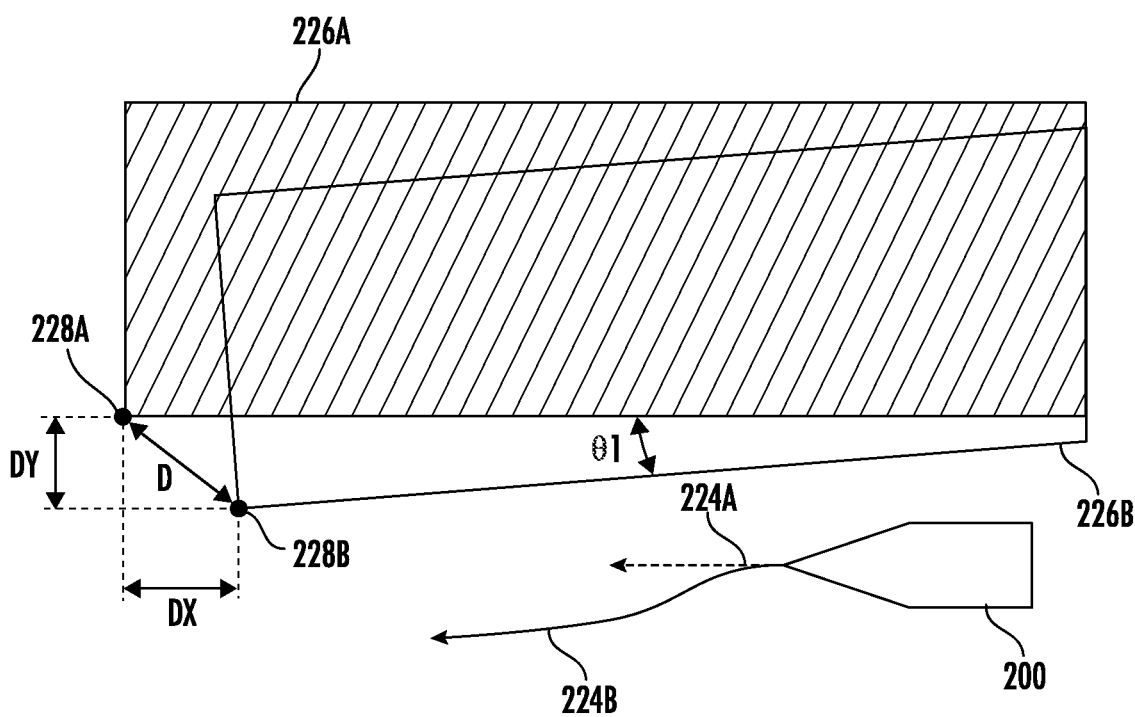
Figure 3A:
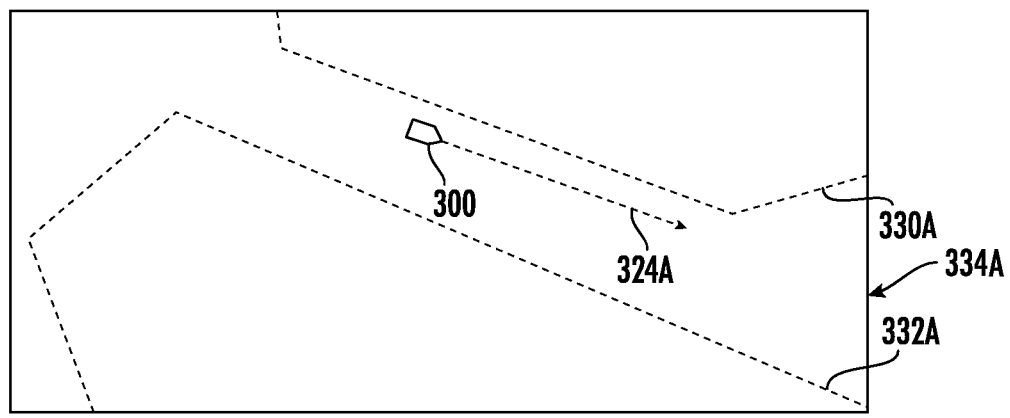
Figure 3B:
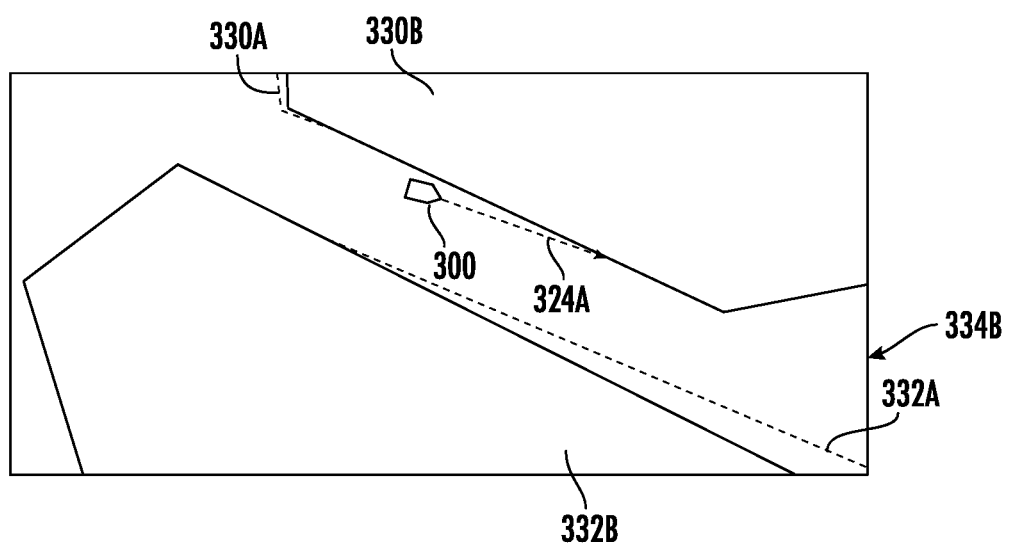
Figure 4A:
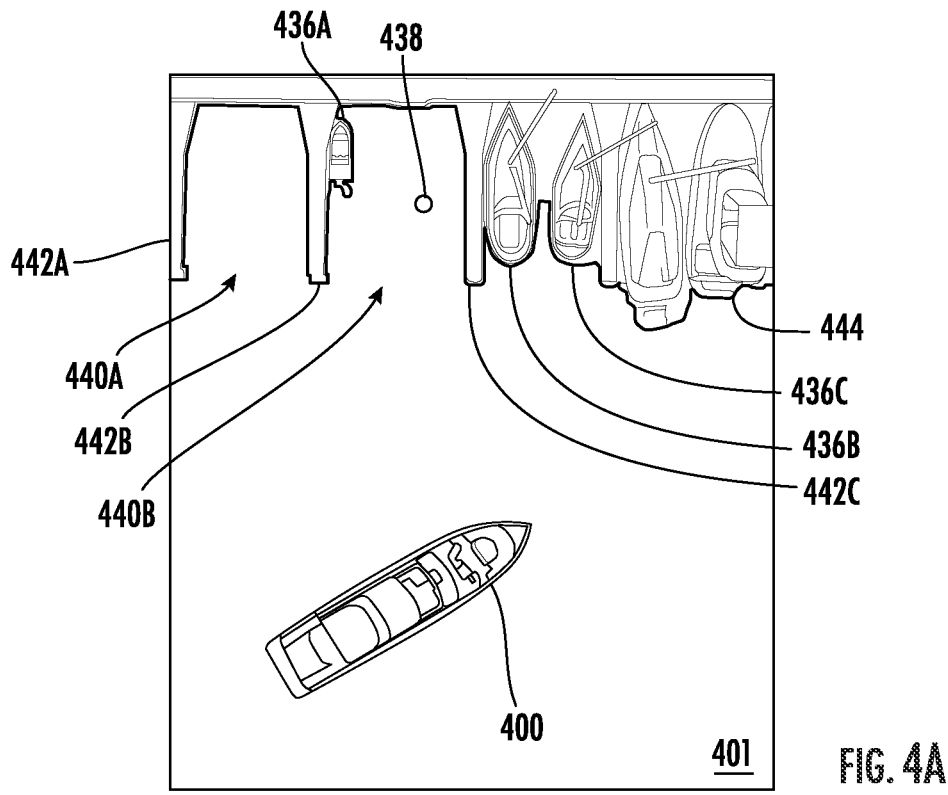
Figure 4B:
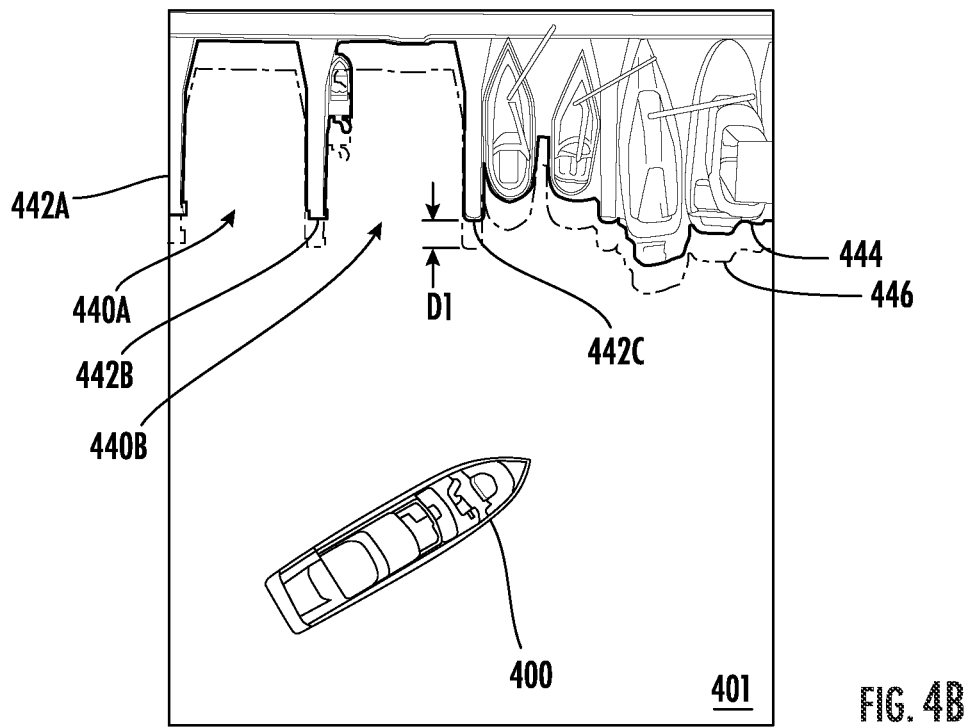
Figure 4C:
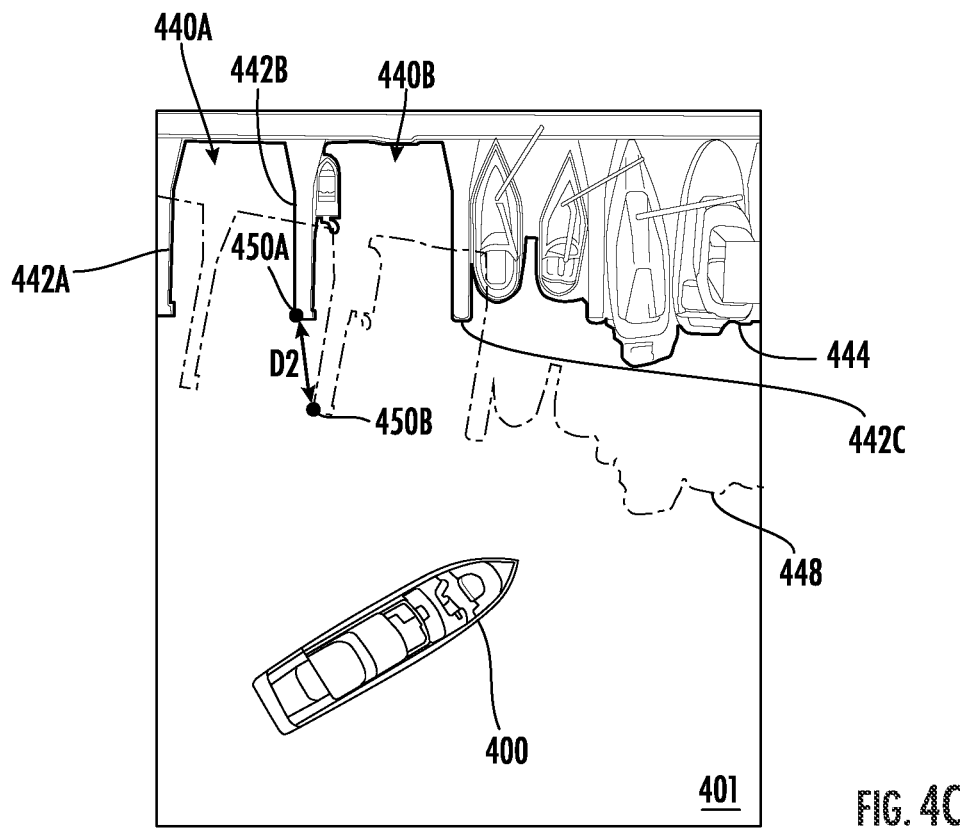
Figure 4D:
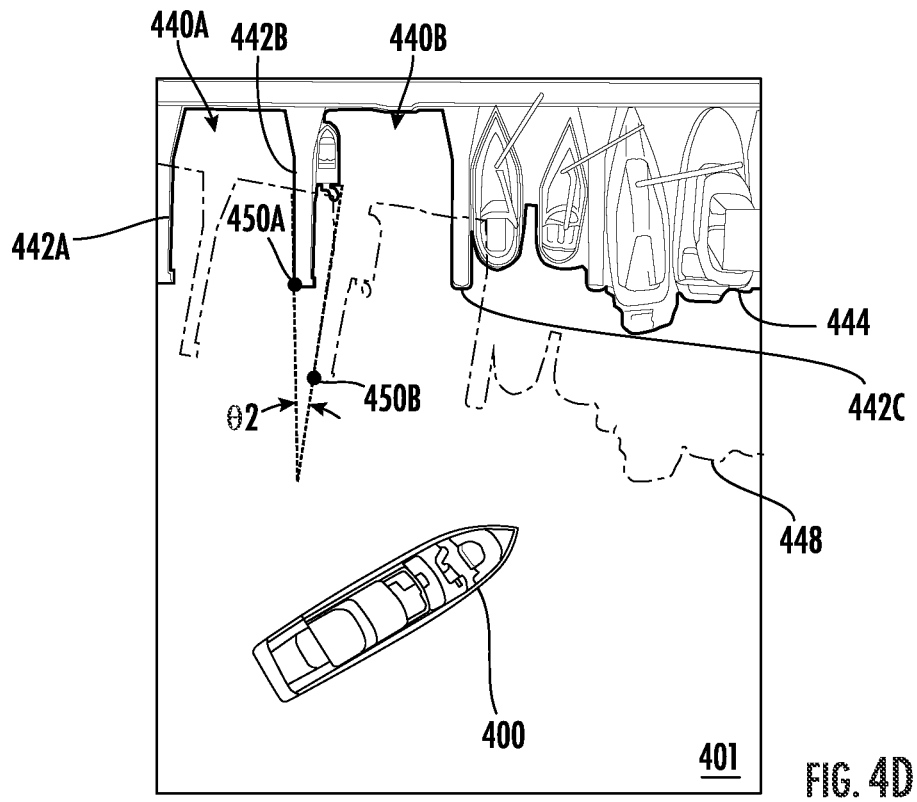
Figure 5:
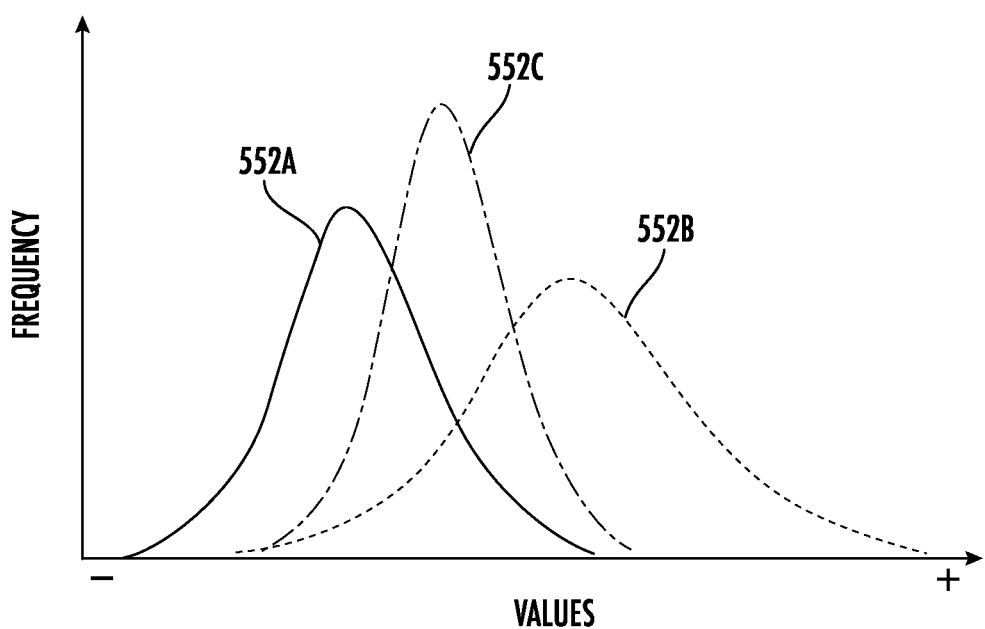
Figure 6A:
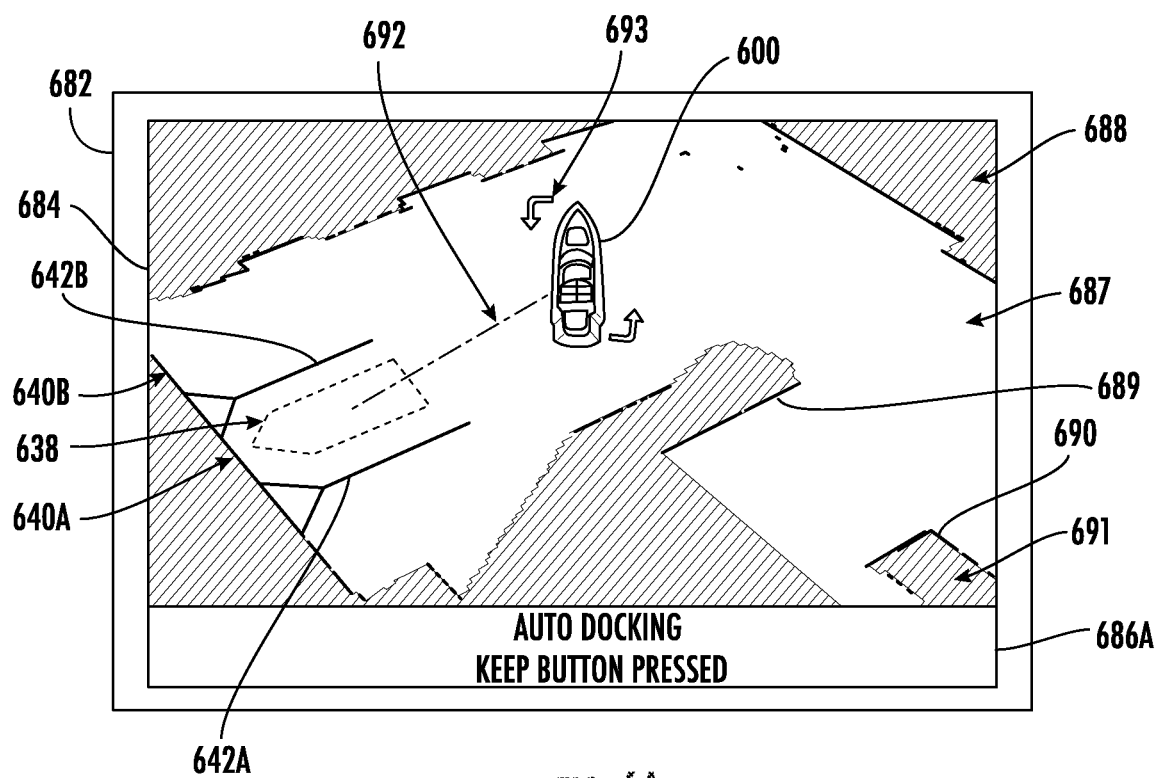
Figure 6B:
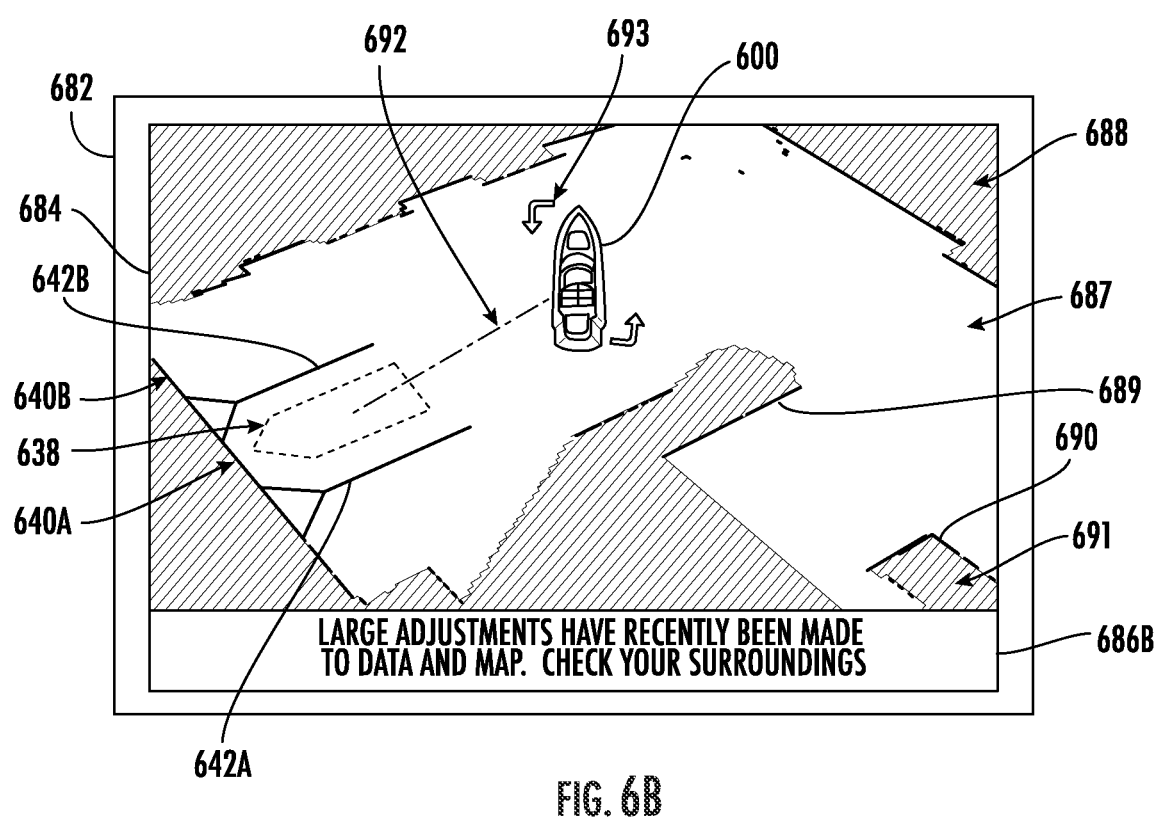
Figure 7:
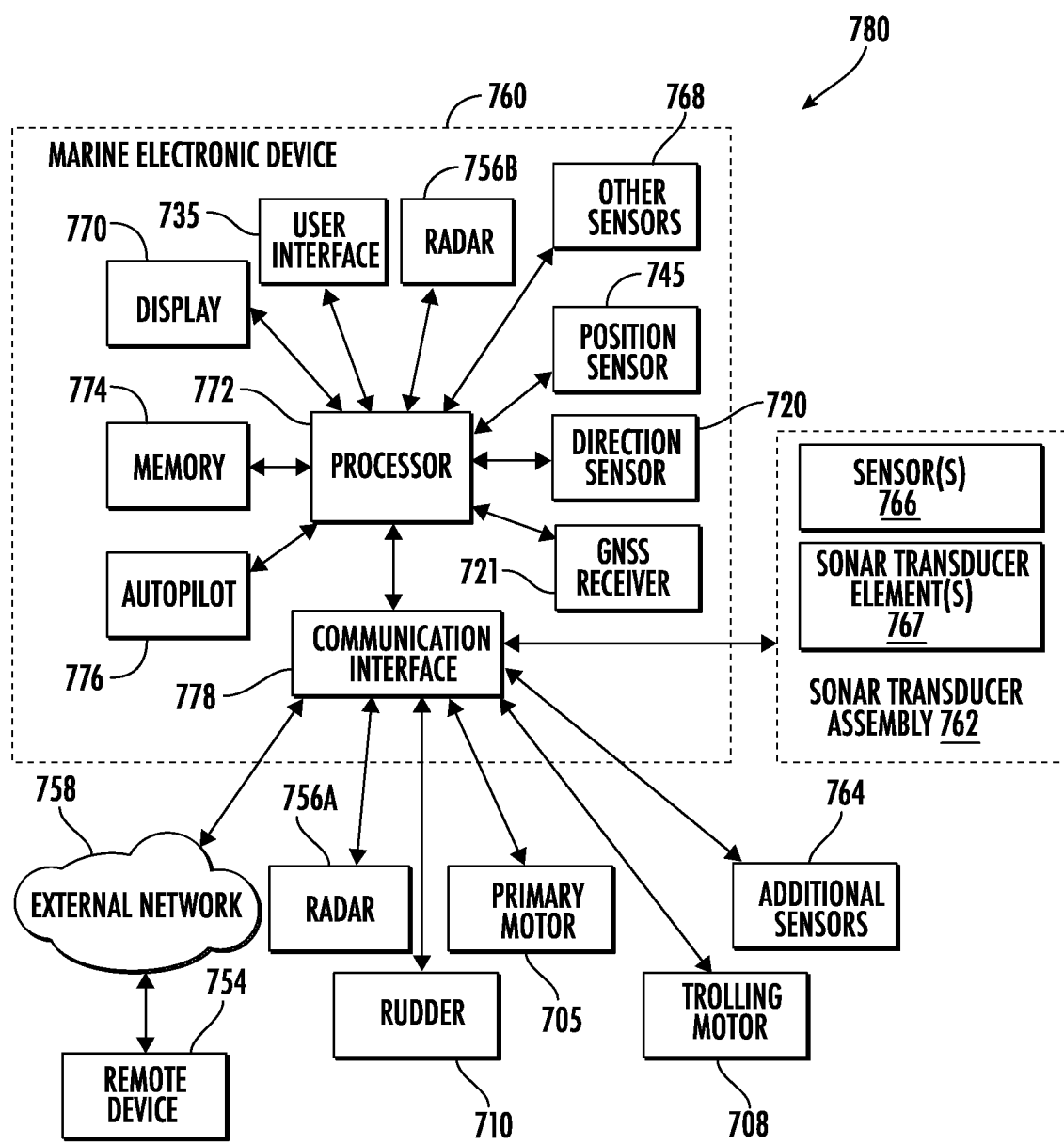
Figure 8:
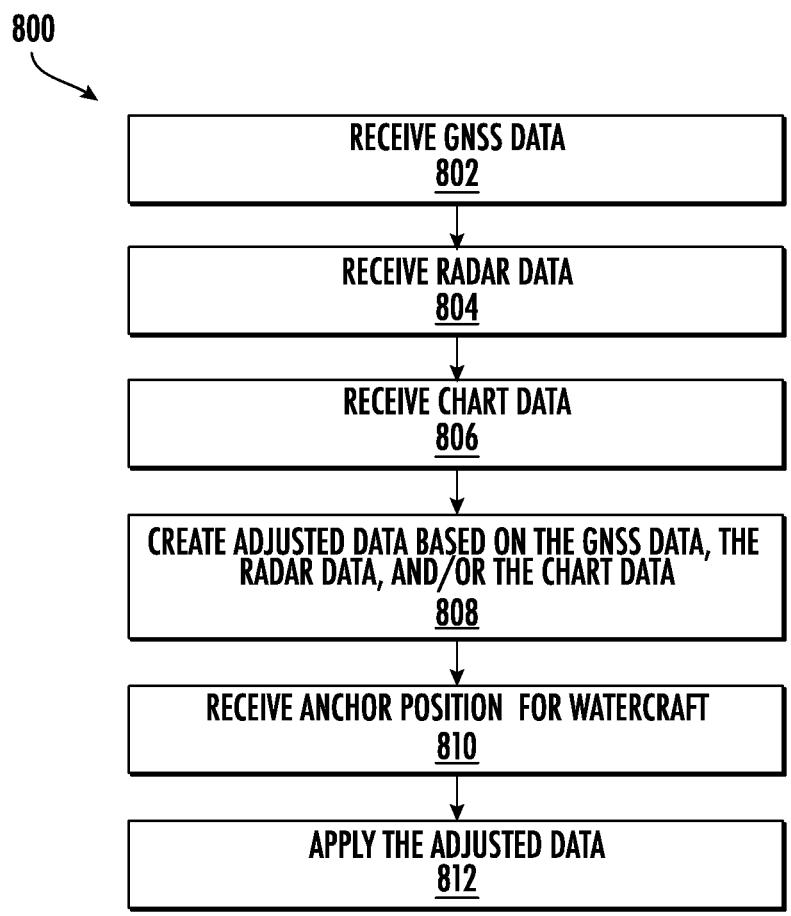
Figure 9:
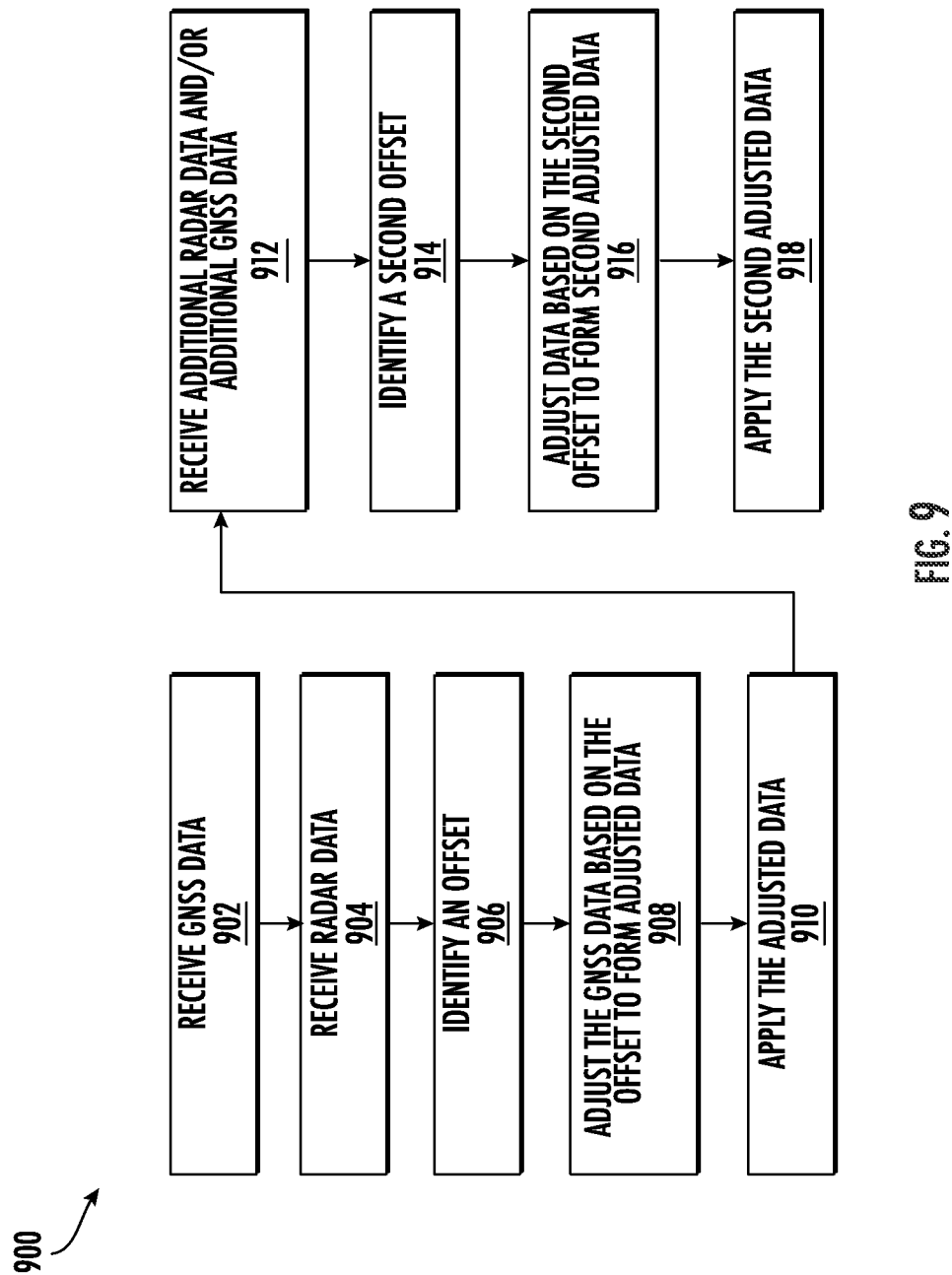
Figure 10:
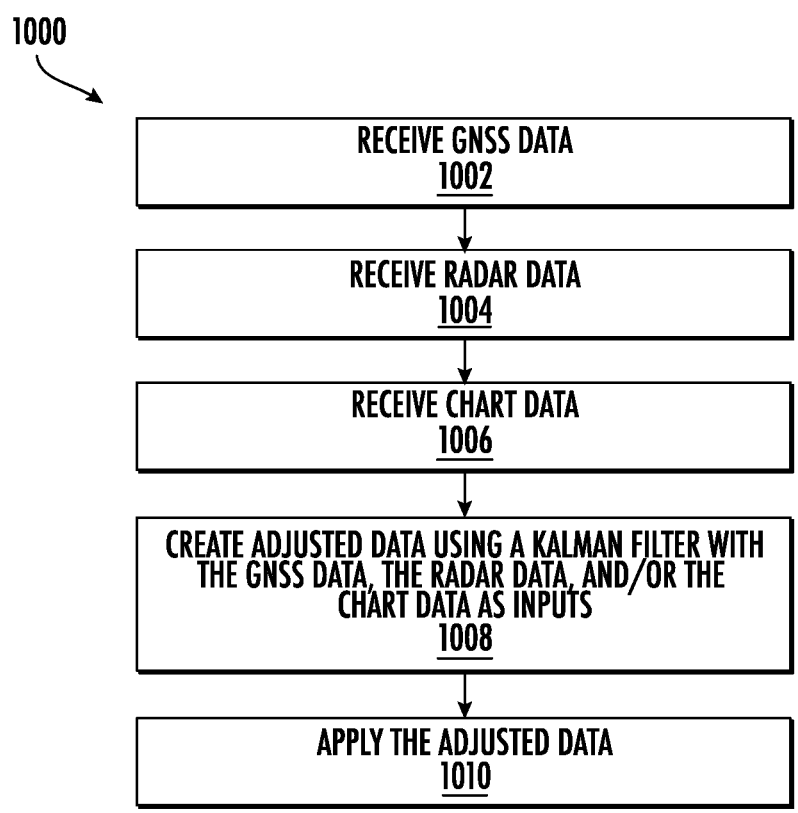

Having thus described the invention in general terms, reference will now be made to the accompanying drawings, which are not necessarily drawn to scale, and wherein:

FIG. 1A is a schematic view illustrating an example watercraft including various marine devices, in accordance with some embodiments discussed herein;

FIG. 1B is a perspective view illustrating an example radar, in accordance with some embodiments discussed herein;

FIG. 2 is a schematic, top view illustrating an example watercraft navigating proximate to an object where inaccuracies are present in the GNSS data, in accordance with some embodiments discussed herein;

FIG. 3A is a nautical chart with a representation of a watercraft positioned and oriented thereon using GNSS data, in accordance with some embodiments discussed herein;

FIG. 3B is a chart where radar data is superimposed on the nautical chart of FIG. 3A and where inaccuracies are present in the GNSS data, in accordance with some embodiments discussed herein;

FIG. 4A is a top view illustrating an example watercraft navigating to a desired docking position, in accordance with some embodiments discussed herein;

FIG. 4B is a top view illustrating an example watercraft navigating to a desired docking position where there is a linear offset in the GNSS data, in accordance with some embodiments discussed herein;

FIGS. 4C-4D are top views illustrating an example watercraft navigating to a desired docking position where there is a linear offset and a rotational offset in the GNSS data, in accordance with some embodiments discussed herein;

FIG. 5 is a chart illustrating an estimate formed by a Kalman filter from two other input variables that each have uncertainty, in accordance with some embodiments discussed herein;

FIG. 6A-6B are schematic views illustrating example screens presented on an example display, in accordance with some embodiments discussed herein;

FIG. 7 is a block diagram illustrating electrical components for an example system, in accordance with some embodiments discussed herein; and FIGS. 8-10 are flowcharts illustrating example methods for refining GNSS data for a watercraft to form adjusted data, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals generally refer to like elements throughout. For example, reference numbers 224A and 324A each refer to a heading direction of a watercraft. Additionally, any connections or attachments may be direct or indirect connections or attachments unless specifically noted otherwise.

FIG. 1A is a schematic view illustrating an example watercraft including various marine devices. As illustrated in FIG. 1A, the watercraft 100 (e.g., a vessel) is configured to traverse a marine environment, e.g. body of water 101, and may use one or more sonar transducer assemblies 102a, 102b, and 102c disposed on and/or proximate to the watercraft 100. Notably, example watercraft contemplated herein may be surface watercraft, submersible watercraft, or any other implementation known to those skilled in the art. The sonar transducer assemblies 102a, 102b, and 102c may each include one or more transducer elements configured to transmit sound waves into a body of water, receive sonar returns from the body of water, and convert the sonar returns into sonar return data. Various types of sonar transducers may be utilized—for example, a linear downscan sonar transducer, a conical downscan sonar transducer, a sidescan sonar transducer, and/or one or more arrays of a plurality of sonar transducer elements.

Depending on the configuration, the watercraft 100 may include a primary motor 105, which may be a main propulsion motor such as an outboard or inboard motor. Additionally, the watercraft 100 may include a trolling motor 108 configured to propel the watercraft 100 or maintain a position. The one or more sonar transducer assemblies (e.g., 102a, 102b, and/or 102c) may be mounted in various positions and to various portions of the watercraft 100 and/or equipment associated with the watercraft 100. For example, the sonar transducer assembly may be mounted to the transom 106 of the watercraft 100, such as depicted by sonar transducer assembly 102a. The sonar transducer assembly may be mounted to the bottom or side of the hull 104 of the watercraft 100, such as depicted by sonar transducer assembly 102b. The sonar transducer assembly may be mounted to the trolling motor 108, such as depicted by sonar transducer assembly 102c. Other mounting configurations are contemplated also, such as may enable rotation of the sonar transducer assembly (e.g., mechanical and/or manual rotation, such as on a rod or other mounting connection).

The watercraft 100 may also include a marine electronic device 160, such as may be utilized by a user to interact with, view, or otherwise control various functionality regarding the watercraft, including, for example, nautical charts and various sonar systems described herein. In the illustrated embodiment, the marine electronic device 160 is positioned proximate the helm (e.g., steering wheel) of the watercraft 100—although other places on the watercraft 100 are contemplated. Likewise, additionally or alternatively, a remote device (such as a user's mobile device) may include functionality of a marine electronic device.

The watercraft 100 may also comprise other components within the marine electronic device 160 or at the helm. In FIG. 1A, the watercraft 100 comprises a radar 116, which is mounted at an elevated position (although other positions relative to the watercraft are also contemplated). Radar (RAdio Detection And Ranging), uses radio waves to determine the distance, angle, and radial velocity of objects relative to the watercraft. A radar system typically includes an antenna, a transmitter that emits electromagnetic waves corresponding to radar signals, a receiver for receiving radar return signals (the radar signals that reflect off objects and return to the antenna), and a processor to process the radar return signals. The processed radar return signals can be formed into radar image data that is presented on a display device of the watercraft, often as an image type known as plan position indicator (PPI), although other image types can be formed (such as described herein).

The watercraft 100 also comprises an AIS transceiver 118, a direction sensor 120, and a camera 122, and these components are each positioned at or near the helm (although other positions relative to the watercraft 100 are also contemplated). The watercraft 100 also comprises a GNSS receiver 121 that is configured to receive data from a GNSS. Additionally, the watercraft 100 comprises a rudder 110 at the stern of the watercraft 100, and the rudder 110 is positioned on the watercraft 100 so that the rudder 110 rests in the body of water 101. In other embodiments, some of these components may be integrated into the marine electronic device 160 or other devices. Another example device on the watercraft 100 includes a temperature sensor 112 that may be positioned so that it either rests within or outside of the body of water 101. Other example devices include a wind sensor, one or more speakers, and various vessel devices/features (e.g., doors, bilge pump, fuel tank, etc.), among other things. Additionally, one or more sensors may be associated with marine devices; for example, a sensor may be provided to detect the position of the primary motor 105, the trolling motor 108, or the rudder 110.

An example radar is illustrated in the perspective view of FIG. 1B. The radar 116 may include a housing 107 and an antenna 109. In some embodiments, this antenna 109 may be configured to rotate relative to the housing 107 of the radar device 116. The antenna 109 may be connected to a rotary joint in the housing 107. A channel within the housing 107 may be configured to transfer radio-frequency power to or from the antenna 109. The radar 116 may include one or more processors and associated memory within the housing 107. The radar 116 may be configured to emit radio waves from the antenna 109, and some of the energy from the radio waves is reflected back to the radar 116 so that data may be obtained. In some embodiments, the radar 116 may be a Doppler radar.

Looking now at FIG. 2, an example watercraft 200 is illustrated navigating proximate to an object where inaccuracies are present in the GNSS data. Inaccuracies are frequently present in GNSS data that may potentially create the risk of safety hazards such as collisions.

FIG. 2 illustrates a GNSS object outline 226A that is determined by GNSS data. This GNSS data may be obtained from a GNSS 121 (see FIG. 1) mounted to the watercraft 100 (see FIG. 1). The point 228A may be provided on the GNSS object outline 226A. In some embodiments, the object that is represented by the GNSS object outline 226A may be a fixed object rather than a transient object.

FIG. 2 also illustrates a radar object outline 226B that is determined by radar data. The radar data may be obtained from a radar 116 (see FIG. 1) mounted to the watercraft 100 (see FIG. 1). The point 228B may be provided on the radar object outline 226B. In some embodiments, the object that is represented by the radar object outline 226B may be a fixed object rather than a transient object.

FIG. 2 also illustrates the linear offset D and the rotational offset θ1 between the GNSS object outline 226A and the radar object outline 226B. The linear offset D may comprise a first dimensional offset DX and a second dimensional offset DY. In some embodiments, the linear offset D and/or the rotational offset θ1 may be identified, and the GNSS data may be adjusted based on one or more of these offsets to form adjusted data that is more accurate. In some embodiments, the linear offset D or rotational offset θ1 may result from jitter in the GNSS data.

Data may be adjusted using the GNSS data used to form the GNSS object outline 226A and by using the radar data used to form the radar object outline 226B. As discussed further herein, this data may be adjusted by identifying the offset between the one or more points represented in the GNSS data and the radar data, and data may also be adjusted by filtering data with a Kalman filter using the GNSS data and the radar data as inputs. Notably, additional, subsequent passes of the radar (e.g., sweeps) may lead to even more refined adjusted data. Once adjusted data is formed, the adjusted data may be applied by causing the watercraft to make autonomous navigational changes using the adjusted data.

An example of autonomous navigational changes is illustrated in FIG. 2. The watercraft 200 is illustrated as navigating in the direction 224A. If the watercraft 200 continues traveling in this direction 224A, the watercraft 200 may risk coming in close proximity and potentially colliding with the object represented by the GNSS object outline 226A and the radar object outline 226B. The object may itself be moving in the water, making it beneficial to remain a safe distance away from the object to avoid collisions. An action may be taken to automatically navigate the watercraft using the adjusted data by making an adjusted navigational path 224B. As illustrated in FIG. 2, this adjusted navigational path 224B may cause the watercraft to navigate farther away from both the GNSS object outline 226A and the radar object outline 226B, reducing the risk of potential collisions with the object represented by these outlines 226A, 226B.

Inaccuracies in GNSS data may also cause significant navigational errors over the course of time, and an example of this is illustrated in FIGS. 3A-3B. Looking first at FIG. 3A, a nautical chart is illustrated where a representation of a watercraft 300 is positioned on the nautical chart using GNSS data. A representation of a heading direction 324A of the watercraft is also illustrated. In the example illustrated in FIG. 3A, the watercraft is navigating through a channel of water between two land masses. A first land mass is represented by the first representation 330A, a second land mass is represented by the second representation 332A, and a first water channel representation 334A is positioned between the first representation 330A and the second representation 332A. The representations 330A, 332A, 334A are each determined using GNSS data. In the nautical chart provided in FIG. 3A, the representations are presented so that it appears that the watercraft may safely travel through the channel of water between the two land masses. The heading direction 324A appears to extend safely within the first water channel representation 334A. However, as illustrated in FIG. 3B, the GNSS data may lack the desired level of accuracy, and there may be a risk of collisions if no course correction is taken.

Turning now to FIG. 3B, the nautical chart of FIG. 3A is illustrated with radar data superimposed on the chart. Radar data is used to form a first radar representation 330B of the first land mass, a second radar representation 332B of the second land mass, and a radar water channel representation 334B. As illustrated in FIG. 3B, the heading direction 324A does not extend safely through the radar water channel representation 334B. Instead, the heading direction 324A is directed into the first radar representation 330B of the first land mass, so the watercraft is at a risk of colliding with the first land mass according to the radar data. When inaccuracies are present in the GNSS data or the nautical charts, the chart may be updated to form an updated chart using adjusted data, and the updated chart may be presented on a display. The charts may be updated using the radar data within areas where it is available, allowing for a reduction of large scale offsets at distant locations. The use of radar data also reduces the amount of jitter in the position and heading direction of the watercraft representation in the updated chart.

As a watercraft navigates in a body of water, the watercraft may have various objects that serve as obstacles as the watercraft moves to a desired docking position, and radar data may be used to accurately map various objects. FIG. 4A is a top view illustrating a representation of a watercraft 400 as a docking operation is being performed at the watercraft so that the watercraft is navigated to the desired docking position 438. Various docks extend out into the body of water. For example, a first dock, a second dock, and a third dock extend into the water. FIG. 4A illustrates a representation of a first dock 442A, a representation of a second dock 442B, a representation of a third dock 442C, and representations of additional docks. Various slots may be provided between these docks. For example, a first slot is positioned between the first dock and the second dock, and a representation of a first slot 440A is positioned between the representation of the first dock 442A and the representation of the second dock 442B. Additionally, a second slot is positioned between the second dock and the third dock, and a representation of a second slot 440B is positioned between the representation of the second dock 442B and the representation of the third dock 442C in FIG. 4A. Various watercraft may be provided in the environment surrounding the watercraft. For example, a representation of a first watercraft 436A, a representation of a second watercraft 436B, a representation of a third watercraft 436C, and representations of other watercraft are illustrated in FIG. 4A. Each of these watercraft are in slots between the docks, but the watercraft may be provided at other locations in the environment surrounding the watercraft. As the watercraft is docking, docks, other watercraft, and other objects should be accounted for to avoid collisions.

As illustrated in FIG. 4A, a boundary line representation 444 is provided to reflect the boundaries of nearby objects. In FIG. 4A, the boundary line representation 444 is accurate without any errors. However, FIGS. 4B-4D illustrate how inaccuracy in the data may impact the boundary lines and any charts that are obtained.

Looking first at FIG. 4B, a representation of the watercraft and the environment around the watercraft is illustrated based on GNSS data where there are inaccuracies in the GNSS data. FIG. 4B also includes a radar-determined boundary line representation 446, and the boundary line representation 444 is determined by GNSS data. As illustrated, the boundary line representation 444 and the boundary line representation 446 are offset from each other by a linear offset distance D1. This linear offset distance D1 is 1.0 meters in the illustrated embodiment, but the linear offset distance D1 may be different in other embodiments. When inaccuracies are present in GNSS data or nautical charts using GNSS data as illustrated in FIG. 4B, the chart may be updated to form an updated chart using adjusted data, and the updated chart may be presented on a display.

Turning now to FIGS. 4C-4D, schematic views are provided illustrating another example watercraft navigating to a desired docking position where there is both a linear offset and a rotational offset in the GNSS data. In FIGS. 4C-4D, a radar-determined boundary line representation 448 is illustrated, and the boundary line representation 444 is also illustrated again. A first point 450A is illustrated on the boundary line representation 444. This first point 450A is point at the end of the representation of the second dock 442B. Additionally, a second point 450B is illustrated, with this second point 450B being a fixed point at the corresponding location on the radar-determined boundary line representation 448.

In FIG. 4C, the linear offset distance D2 between the first point 450A and the second point 450B is illustrated. Additionally, in FIG. 4D, the rotational offset θ2 is illustrated between the radar-determined boundary line representation 448 and the boundary line representation 444. When inaccuracies are present in the GNSS data or the nautical charts as illustrated in FIGS. 4C-4D, the chart may be updated to form an updated chart using adjusted data, and the updated chart may be presented on a display.

Where inaccuracies are present in the data, this may cause the operator of the watercraft (e.g., user, autopilot, other navigation system, etc.) to make incorrect navigational decisions, and this may increase the risk of potential collisions as the operator navigates the watercraft. Notably, where inaccuracies are present in the data, this may be particularly problematic where automated navigation operations are being conducted. For example, where a watercraft is auto-docking and inaccuracies are present in the GNSS data, then the automated navigational systems may risk inadvertent collisions with objects such as docks, buoys, or other watercraft. Additionally, the auto-docking operation may fail to reach the desired location due to inaccuracies in the GNSS data.

Kalman filters may be utilized in some embodiments herein as an approach to provide refined data having improved accuracy. FIG. 5 is a probability density function chart illustrating an estimate formed by a Kalman filter from two input variables that each have uncertainty. The Kalman filter is an estimation algorithm that is configured to refine input data. On the X-axis, values increase from left to right, and values may be provided for various items. For example, the values may be a location, a coordinate such as a longitudinal or latitudinal coordinate, or a velocity, but various other values may be used. A first input variable curve 552A and a second input variable curve 552B are illustrated. Both the first input variable curve 552A and the second input variable curve 552B represent data having Gaussian distributions. As illustrated, the first input variable curve 552A is centered at a lower value than the second input variable curve 552B. Additionally, the first input variable curve 552A may have a lower variance and standard distribution as compared to the second input variable curve 552B.

The two inputs represented by curves 552A, 552B may be input into a Kalman filter to provide an estimate of the value. The curve 552C represents filtered data from the estimate formed by the Kalman filter. The curve 552C is positioned between the curves 552A, 552B, and the curve 552C has a lower variance and standard distribution as compared to the curves 552A, 552B. Thus, the filtered data 552C generated by the Kalman filter may allow for more accurate predictions of the actual location of other objects in a watercraft environment. With the Kalman filter, the inputs represented by the curves 552A, 552B may have different impacts on the data that is generated by the Kalman filter. For example, the curve 552A may have a greater impact on the data that is generated by the Kalman filter, and this may be because of the lower variance and standard distribution for the curve 552A. However, the curve 552A may also have a greater impact for other reasons (e.g., because a greater number of data points are available). In some embodiments, herein, radar data, GNSS data, and/or chart data may be provided as inputs into a Kalman filter to generate an estimate regarding the position or orientation of the watercraft and one or more objects around the watercraft.

It should be understood that FIG. 5 is merely provided for the purposes of illustration and that the curves illustrated in FIG. 5 are not intended to reflect the actual values or variances in radar data or GNSS data. The actual distributions for the first set of input data points 552A, the second set of input data points 552B, and the filtered data 552C may be significantly different in other embodiments. For example, the variances of the data may be significantly higher or lower, the distributions may have different shapes other than Gaussian distribution curves.

In some embodiments, updated map data may be provided on a screen of a display, and, in some embodiments, the display may also include features to assist in docking a watercraft either automatically or manually. FIG. 6A is a schematic view illustrating an example screen 684 presented on an example display 682. On the screen 684, a representation of a watercraft 600 of a user is illustrated. The screen 684 illustrates the environment surrounding the watercraft, and the screen 684 may be generated using radar data from a radar 116 (see FIGS. 1A-1B). The environment represented in FIG. 6A is generally similar to the environment illustrated in FIG. 4A. A first dock 642A and a second dock 642B are represented on the screen 684, and a first slot 640A and a second slot 640B are also represented on the screen 684.

In the illustrated embodiment, the watercraft that is represented by representation 600 has the desired docking position 638 in the first slot 640A. In navigating the watercraft, the watercraft must navigate around various objects in the surrounding environment. These objects include the first object 689, the second object 690, the first dock 642A, and the second dock 642B. Other objects may also exist such as animals, people within the body of water, buoys, signs, etc. The first object 689 and the second object 690 may be other watercraft that are moving in the water.

In the illustrated embodiment, the screen shows an expanded coverage area 687. In some embodiments, this expanded coverage area 687 may generally include areas proximate to recent positions of the watercraft that fall within the radius of coverage for a radar on the watercraft. Various uncovered areas are illustrated in FIG. 6A. For example, a first uncovered area 688 and a second uncovered area 691 are each illustrated. These uncovered areas may fall outside of a radius of coverage for the radar on the watercraft (and/or this specific operation) as the watercraft moves around. Uncovered areas may also be formed where radar coverage is occluded due to the presence of other objects.

In some embodiments, data may be received from a remote device 754 (see FIG. 7) via an external network 758 (see FIG. 7), and this data may be from other watercraft that have recently navigated in the area. The data from the other watercraft may be utilized to further expand the coverage area or to provide more data points for areas so that the coverage area may be refined.

In some embodiments, a docking operation may be generated using the updated map data. The docking operation may include causing presentation of a docking view illustrating a representation 600 of the watercraft and a desired docking position 638, such as illustrated in FIG. 6A. In FIG. 6A, a vector 692 is also provided that extends from the center of the representation 600 of the watercraft to the desired docking position 638. Symbols 693 are also provided to indicate that rotation of the watercraft is necessary to reach the desired docking position 638. In some embodiments, the docking operation may include generating one or more navigation instructions for causing the watercraft to be repositioned proximate to the desired docking position. For example, the navigation instructions may be to rotate the watercraft by some defined angle and/or to travel some distance in that direction. In other embodiments, the navigation instructions may be more refined to account for more complex routes. For example, more complex routes may be beneficial to avoid fixed or transient objects that are represented in the updated map data. Also, more complex routes may be beneficial to permit a watercraft operator to travel to certain specified waypoints as the watercraft travels to the desired docking position 638.

Once data is adjusted, the adjusted data may be applied by taking some action. In some embodiments, the adjusted data may be applied by performing a docking operation with the adjusted data. The docking operation may be an automated docking operation, a semi-automated docking operation, or a manual docking operation.

In some embodiments, the navigation instructions may be utilized to autonomously or semi-autonomously navigate the watercraft to the desired docking position using the one or more navigation instructions. In the illustrated embodiment, a notification 686A is provided on the screen 684 to indicate to the user that an auto docking process is underway and that the user should keep the button pressed, with the button being a button associated with auto docking. The button may be provided in a user interface 735 (see FIG. 7) of a marine electronic device 760 (see FIG. 7) in some embodiments. In some embodiments, the navigation instructions may be utilized to provide an instruction on a display with the one or more navigation instructions.

Looking now at FIG. 6B, a display 682 and a screen 684 are provided that are similar to those presented in FIG. 6A. However, in FIG. 6B, an alert 686B is included on the screen instead of the notification 686A. The alert 686B informs the user that large adjustments have recently been made to the data and the map and advises the user to check his or her surroundings. This alert 686B may be generated after data adjustments have been made and after the chart presented on the screen 684 is updated to form an updated chart and after causing presentation of the updated chart on a display 682. The alert 686B presented to the user may provide warnings related to other issues such as required inspections, components that are damaged, weather information, or risk of a potential collision. It should be understood that these are merely examples of potential alerts, and other approaches for automatically navigating the watercraft may also be utilized.

Various systems described herein, such as the watercraft, may have various electrical components, and FIG. 7 is a block diagram illustrating some such electrical components that may be utilized with various example embodiments described herein. The system 780 may comprise numerous marine devices. As shown in FIG. 7, a sonar transducer assembly 762, a radar 756A, a rudder 710, a primary motor 705, a trolling motor 708, and additional sensors/devices 764 may be provided as marine devices, but other marine devices may also be provided. One or more marine devices may be implemented on the marine electronic device 760 as well. For example, a position sensor 745, a direction sensor 720, an autopilot 776, a GNSS receiver 721, and other sensors/devices 768 may be provided within the marine electronic device 760. These marine devices can be integrated within the marine electronic device 760, integrated on a watercraft at another location and connected to the marine electronic device 760, and/or the marine devices may be implemented at a remote device 754 in some embodiments. For example, the GNSS receiver 721, may be positioned at another location on a watercraft outside of the marine electronic device 760. The system 780 may include any number of different systems, modules, or components; each of which may comprise any device or means embodied in either hardware, software, or a combination of hardware and software configured to perform one or more corresponding functions described herein.

The marine electronic device 760 may include at least one processor 772, a memory 774, a communication interface 778, a user interface 735, a display 770, autopilot 776, and one or more sensors (e.g. position sensor 745, direction sensor 720, other sensors/devices 768). One or more of the components of the marine electronic device 760 may be located within a housing or could be separated into multiple different housings (e.g., be remotely located).

The processor(s) 772 may be any means configured to execute various programmed operations or instructions stored in a memory device (e.g., memory 774) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor(s) 772 as described herein. In this regard, the processor(s) 772 may be configured to analyze electrical signals communicated thereto to provide or receive radar data from one or more radar devices and additional (e.g., secondary) data from other sources. For example, the processor(s) 772 may be configured to receive radar data and additional data, determine an expected position, velocity (if any), an object type for an object, and/or determine a corrective action based on the deviation. In some embodiments, the processor(s) 772 may be further configured to implement signal processing.

In an example embodiment, the memory 774 may include one or more non-transitory storage or memory devices such as, for example, volatile and/or non-volatile memory that may be either fixed or removable. The memory 774 may be configured to store instructions, computer program code, radar data, and additional data such as sonar data, chart data, location/position data in a non-transitory computer readable medium for use, such as by the processor(s) 772 for enabling the marine electronic device 760 to carry out various functions in accordance with example embodiments of the present invention. For example, the memory 774 could be configured to buffer input data for processing by the processor(s) 772. Additionally or alternatively, the memory 774 could be configured to store instructions for execution by the processor(s) 772. The memory 774 may include computer program code that is configured to, when executed, cause the processor(s) 772 to perform various methods described herein. The memory 774 may serve as a non-transitory computer readable medium having stored thereon software instructions that, when executed by a processor, cause methods described herein to be performed.

The communication interface 778 may be configured to enable communication to external systems (e.g. an external network 758). In this manner, the marine electronic device 760 may retrieve stored data from a remote device 754 via the external network 758 in addition to or as an alternative to the onboard memory 774. Additionally or alternatively, the marine electronic device 760 may transmit or receive data, such as radar signal data, radar return data, radar image data, path data or the like to or from a sonar transducer assembly 762. In some embodiments, the marine electronic device 760 may also be configured to communicate with other devices or systems (such as through the external network 758 or through other communication networks, such as described herein). For example, the marine electronic device 760 may communicate with a propulsion system of the watercraft 100 (e.g., for autopilot control); a remote device (e.g., a user's mobile device, a handheld remote, etc.); or another system.

The communications interface 778 of the marine electronic device 760 may also include one or more communications modules configured to communicate with one another in any of a number of different manners including, for example, via a network. In this regard, the communications interface 778 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or transducer assemblies) may be included in the system 780.

The position sensor 745 may be configured to determine the current position and/or location of the marine electronic device 760 (and/or the watercraft 100). For example, the position sensor 745 may comprise a GPS, bottom contour, inertial navigation system, such as machined electromagnetic sensor (MEMS), a ring laser gyroscope, or other location detection system. Alternatively or in addition to determining the location of the marine electronic device 760 or the watercraft 100, the position sensor 745 may also be configured to determine the position and/or orientation of an object outside of the watercraft 100.

The display 770 (e.g. one or more screens) may be configured to present images and may include or otherwise be in communication with a user interface 735 configured to receive input from a user. The display 770 may be, for example, a conventional LCD (liquid crystal display), a touch screen display, mobile device, or any other suitable display known in the art upon which images may be displayed.

In some embodiments, the display 770 may present one or more sets of data (or images generated from the one or more sets of data). Such data includes chart data, radar data, sonar data, weather data, location data, position data, orientation data, sonar data, or any other type of information relevant to the watercraft. Radar data may be received from radar 756A located outside of a marine electronic device 760, radar 756B located in a marine electronic device 760, or from radar devices positioned at other locations, such as remote from the watercraft. Additional data may be received from marine devices such as a sonar transducer assembly 762, a primary motor 705 or an associated sensor, a trolling motor 708 or an associated sensor, an autopilot 776, a rudder 710 or an associated sensor, a position sensor 745, a direction sensor 720, other sensors/devices 768, a remote device 754, onboard memory 774 (e.g., stored chart data, historical data, etc.), or other devices.

The user interface 735 may include, for example, a keyboard, keypad, function keys, buttons, a mouse, a scrolling device, input/output ports, a touch screen, or any other mechanism by which a user may interface with the system.

Although the display 770 of FIG. 7 is shown as being directly connected to the processor(s) 772 and within the marine electronic device 760, the display 770 could alternatively be remote from the processor(s) 772 and/or marine electronic device 760. Likewise, in some embodiments, the position sensor 745 and/or user interface 735 could be remote from the marine electronic device 760.

The marine electronic device 760 may include one or more other sensors/devices 768, such as configured to measure or sense various other conditions. The other sensors/devices 768 may include, for example, an air temperature sensor, a water temperature sensor, a current sensor, a light sensor, a wind sensor, a speed sensor, or the like.

A sonar transducer assembly 762 is also provided in the system 780. The sonar transducer assembly 762 illustrated in FIG. 7 may include one or more sonar transducer elements 767, such as may be arranged to operate alone or in one or more transducer arrays. In some embodiments, additional separate sonar transducer elements (arranged to operate alone, in an array, or otherwise) may be included. As indicated herein, the sonar transducer assembly 762 may also include a sonar signal processor or other processor (although not shown) configured to perform various sonar processing. In some embodiments, the processor (e.g., processor(s) 772 in the marine electronic device 760, a controller (or processor portion) in the sonar transducer assembly 762, or a remote controller—or combinations thereof) may be configured to filter sonar return data and/or selectively control sonar transducer element(s) 767. For example, various processing devices (e.g., a multiplexer, a spectrum analyzer, A-to-D converter, etc.) may be utilized in controlling or filtering sonar return data and/or transmission of sonar signals from the sonar transducer element(s) 767. The processor(s) 772 may also be configured to filter data regarding certain objects out of map data.

The sonar transducer assembly 762 may also include one or more other systems, such as various sensor(s) 766. For example, the sonar transducer assembly 762 may include an orientation sensor, such as gyroscope or other orientation sensor (e.g., accelerometer, MEMS, etc.) that can be configured to determine the relative orientation of the sonar transducer assembly 762 and/or the one or more sonar transducer element(s) 767—such as with respect to a forward direction of the watercraft. In some embodiments, additionally or alternatively, other types of sensor(s) are contemplated, such as, for example, a water temperature sensor, a current sensor, a light sensor, a wind sensor, a speed sensor, or the like. While only one sonar transducer assembly 762 is illustrated in FIG. 7, additional sonar transducer assemblies may be provided in other embodiments.

The components presented in FIG. 7 may be rearranged to alter the connections between components. For example, in some embodiments, a marine device outside of the marine electronic device 760, such as the radar 756A, may be directly connected to the processor(s) 772 rather than being connected to the communication interface 778. Additionally, sensors and devices implemented within the marine electronic device 760 may be directly connected to the communications interface in some embodiments rather than being directly connected to the processor(s) 772.

Example Flowchart(s)

Embodiments of the present invention provide methods, apparatus and computer program products for operating a sonar system according to various embodiments described herein. Various methods are contemplated for refining GNSS data for a watercraft. Various examples of the operations performed in accordance with embodiments of the present invention will now be provided with reference to FIG. 8-10.

Looking first at FIG. 8, a flowchart is provided illustrating an example method 800 for refining GNSS data for a watercraft. Various types of data are received in the method 800. At operation 802, GNSS data is received. This GNSS data may be directly or indirectly received from a GNSS mounted to the watercraft. At operation 804, radar data is received. This radar data may be directly or indirectly received from a radar mounted to the watercraft. Additionally, chart data may be received at operation 806, but operation 806 may be omitted in some embodiments.

At operation 808, adjusted data is created using the GNSS data, the radar data, and/or the chart data. In some embodiments, adjusted data may be created without the chart data and may be created only based on the GNSS data and the radar data. Adjusted data may be created in various ways. In one example approach, the adjusted data may be created using a Kalman filter with the GNSS data, the radar data, and/or the chart data as inputs. In another example approach, the adjusted data may be created by first identifying an offset between the GNSS data and the radar data and then by adjusting the GNSS data based on the offset to form adjusted data. The offset includes a linear offset between the GNSS data and the radar data and/or a rotational offset between the GNSS data and the radar data. The GNSS data may be adjusted based on the offset to form adjusted data by applying at least one of a linear adjustment value or a rotational adjustment value to the GNSS data, with the linear adjustment value being equal to the linear offset and with the rotational adjustment value being equal to the rotational offset. In some embodiments, some factor may be applied to the offset (e.g., linear and/or rotational offset), such as 0.5 indicating an incremental adjustment to the data, although other factors may be applied, such as 0.1, 0.2, 0.25, 0.8, 0.9, etc.

In some embodiments where an offset approach is used to form adjusted data, the offset may be determined using fixed GNSS data and fixed radar data. By doing so, a better estimate of the offset may be obtained as the offset between two fixed points may more confidently be attributable to inaccuracies in data rather than movement in an object. Fixed GNSS data may be identified that represents a fixed object within the GNSS data, and fixed radar data may be identified that represents the same fixed object within the radar data. In some embodiments, objects may be identified as a transient or fixed object by accounting for at least one of a size of a transient object, a speed of the transient object, a direction of the transient object, or a shape of the transient object. Data received at different times may be used to distinguish data representing transient objects from data representing fixed objects.

In some embodiments, adjusted data may be formed repetitively as further radar data is received form the radar of the watercraft. The adjusted data may be formed in regular intervals in some embodiments. For example, the adjusted data may be obtained at least once every ten seconds, once every five seconds, or even once every second. The formation of adjusted data at more frequent intervals may allow data presented to the user to have increased accuracy so that the user may be permitted to make more well-informed navigational decisions. In this regard, multiple passes of the radar (e.g., for rotational radar) may provide even more refined adjusted data.

At operation 810, an anchor position of the watercraft may be received (although data or other operations corresponding to other actions, such as described herein, are also contemplated). At operation 812, adjusted data is applied. The adjusted data may be applied in a variety of ways. For example, in embodiments where an anchor position is received at operation 810, a navigational command may be determined based on the adjusted data. The navigational command may include a steering command to rotate the watercraft and/or a thrust command to generate thrust at a motor of the watercraft. Causing this navigational command to be applied may cause the watercraft to shift towards the anchor position. As another example, adjusted data may be applied by performing a docking operation with the adjusted data, and this docking operation may be an automated docking operation, a semi-autonomous docking operation, or a manual docking operation. Additionally, the adjusted data may be applied by automatically navigating the watercraft using the adjusted data. Automatic navigation may occur through an automated docking operation, through automated changes to the heading direction, or through automated changes in the amount of thrust generated at the motor. It should be understood that these are merely examples of potential approaches of automatically navigating the watercraft using the adjusted data, and other approaches for automatically navigating the watercraft may also be utilized. Furthermore, adjusted data may be applied by causing presentation of an alert or another indication regarding the adjusted data. This alert may be similar to the alert 686B illustrated in FIG. 6B in some embodiments, but the alert mart may instead notify the user regarding other issues as discussed herein. Alternatively, the adjusted data may be applied by updating a chart to form an updated chart and causing presentation of the updated chart on a display.

Looking now at FIG. 9, a flowchart is provided illustrating an example method 900 for refining GNSS data for a watercraft where adjusted data is formed using an offset approach. Similar to the method 800 of FIG. 8, various types of data are received in the method 900. At operation 902, GNSS data is received. GNSS data may be received directly or indirectly from a GNSS 121 (see FIG. 1) mounted at the watercraft 100 (see FIG. 1). Radar data is received at operation 904. Additionally, radar data may be received directly or indirectly from a radar 116 (see FIG. 1) mounted to the watercraft 100.

At operation 906, an offset is identified. This offset is be identified between the GNSS data and the radar data, and this offset may include a linear offset between the GNSS data and the radar data and/or a rotational offset between the GNSS data and the radar data.

At operation 908, GNSS data is adjusted based on the offset to form adjusted data. Adjusted data may be formed by applying a linear adjustment value and/or a rotational adjustment value to the GNSS data, with the linear adjustment value being based on (e.g., equal to) the linear offset and with the rotational adjustment value being based on (e.g., equal to) the rotational offset.

At operation 910, the adjusted data is applied. The adjusted data may be applied in a variety of ways. For example, adjusted data may be applied by performing a docking operation with the adjusted data, and this docking operation may be an automated docking operation, a semi-autonomous docking operation, or a manual docking operation. Additionally, the adjusted data may be applied by automatically navigating the watercraft using the adjusted data. Automatic navigation may occur through an automated docking operation, through automated changes to the heading direction, or through automated changes in the amount of thrust generated at the motor. It should be understood that these are merely examples of potential approaches of automatically navigating the watercraft using the adjusted data, and other approaches for automatically navigating the watercraft may also be utilized. Furthermore, adjusted data may be applied by causing presentation of an alert or another indication regarding the adjusted data. This alert may be similar to the alert 686B illustrated in FIG. 6B in some embodiments, but the alert mart may instead notify the user regarding other issues as discussed herein. Alternatively, the adjusted data may be applied by updating a chart to form an updated chart and causing presentation of the updated chart on a display.

At operation 912, additional radar data and/or additional GNSS data may be received. The additional radar data may be received after the radar data is received at operation 904. The additional GNSS data may be received after the GNSS data is received at operation 902. In some embodiment, only additional radar data is received at operation 912, and no additional GNSS data is received.

In some embodiments, radar data is repeatedly received, and adjusted data may be formed repetitively as further radar data is received from the radar of the watercraft. For example, in some embodiments, adjusted data may be formed at least once every ten seconds. In other embodiments, adjusted data may be formed at least once every five seconds. Adjusted data may even be formed at least once every second in some embodiments.

At operation 914, a second offset is identified. This second offset may include at least one of a linear offset between the GNSS data and the additional radar data or a rotational offset between the GNSS data and the additional radar data. Where additional GNSS data is received, the second offset may include at least one of a linear offset between the additional GNSS data and the additional radar data or a rotational offset between the additional GNSS data and the additional radar data.

At operation 916, data is adjusted based on the second offset to form second adjusted data. The data may be adjusted by adjusting the initial GNSS data based on the second offset to form second adjusted data or by adjusting additional GNSS data (where it is provided) based on the second offset to form second adjusted data. The second adjusted data is applied at operation 918. This second adjusted data may be applied in a variety of ways. For example, the second adjusted data may be applied by performing a docking operation with the adjusted data, by automatically navigating the watercraft using the adjusted data, by causing presentation of an alert or other indication regarding the adjusted data, or by updating a chart to form an updated chart and causing presentation of the updated chart on a display.

In some embodiments, adjusted data may be created by focusing on fixed GNSS data and fixed radar data. Fixed GNSS data may be identified, with the fixed GNSS data representing a fixed object within the GNSS data. Additionally, fixed radar data may be identified, with the fixed radar data representing the fixed object within the radar data. Then, an offset may be identified between the GNSS data and the radar data by identifying an offset between the fixed GNSS data and the fixed radar data. By focusing on fixed GNSS data and fixed radar data, the accuracy of adjusted data may be increased as data regarding transient objects may be disregarded.

Looking now at FIG. 10, a flowchart is provided illustrating an example method 1000 for refining GNSS data for a watercraft where adjusted data is formed using a Kalman filter. Similar to the method 800 of FIG. 8 and method 900 of FIG. 9, various types of data are received in the method 1000. At operation 1002, GNSS data is received. GNSS data may be received directly or indirectly at a GNSS receiver 121 (see FIG. 1) mounted at the watercraft 100 (see FIG. 1). Radar data is received at operation 1004. Radar data may be received directly or indirectly from the radar 116 (see FIG. 1) mounted to the watercraft 100. Chart data may be received at operation 1006, but operation 1006 may be omitted in some embodiments so that chart data is not received in method 1000.

At operation 1008, adjusted data is created using a Kalman filter with the GNSS data, the radar data, and/or the chart data being used as inputs. In some embodiments, the adjusted data may be created using a Kalman filter with only the GNSS data and the radar data is inputs.

At operation 1010, the adjusted data is applied. This adjusted data may be applied in a variety of ways, such as described herein. For example, the adjusted data may be applied by performing a docking operation (which may be autonomous, semi-autonomous, manual with guidance, etc.) with the adjusted data, by automatically navigating the watercraft using the adjusted data, by causing presentation of an alert or other indication regarding the adjusted data, or by updating a chart to form an updated chart and causing presentation of the updated chart on a display.

In some embodiments, the methods 800, 900, and 1000 may be executed by a processor and may be stored as software instructions and/or computer program code in a non-transitory computer readable medium and/or memory. However, the methods may be performed by a wide variety of items. Additionally, the operations of methods 800, 900, and 1000 may be performed in various orders, and some of the operations may be performed simultaneously in some embodiments. Some of the operations of methods 800, 900, and 1000 may not be performed in some embodiments—for example, in some embodiments of the method 800, operation 810 may not be performed. In some embodiments, additional operations may be included in the methods 800, 900, and 1000. For example, variations of operations 912-918 of method 900 may be added to methods 800 and 1000.

FIGS. 8-10 illustrate flowcharts of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 774 (see FIG. 7) and executed by, for example, the processor 772 (see FIG. 7). As will be appreciated, any such computer program product may be loaded onto a computer or other programmable apparatus (for example, a marine electronic device 760 (see FIG. 7)) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 760) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method for refining global navigation satellite system (GNSS) data for a watercraft, the method comprising:
receiving, from a global navigation satellite system (GNSS) mounted to the watercraft, the GNSS data;
receiving radar data from a radar mounted to the watercraft;
identifying an offset between the GNSS data and the radar data, wherein the offset includes at least one of a linear offset between the GNSS data and the radar data or a rotational offset between the GNSS data and the radar data;
creating adjusted data based on the identified offset;
receiving additional radar data from the radar;
identifying a second offset between the adjusted data and the additional radar data; and
adjusting the adjusted data based on the second offset to form second adjusted data,
wherein the additional radar data is received after the radar data; and
applying the second adjusted data by taking an action, wherein the action comprises at least one of:
performing a docking operation with the second adjusted data;
automatically navigating the watercraft using the second adjusted data;
causing presentation of an alert or other indication regarding the second adjusted data; or
updating, using the second adjusted data, a chart to form an updated chart and causing presentation of the updated chart on a display.

2. The method of claim 1, wherein the adjusted data is created using a Kalman filter, with the GNSS data and the radar data used as inputs in the Kalman filter.

3. The method of claim 2, further comprising:
receiving chart data,
wherein the GNSS data, the radar data, and the chart data are used as inputs in the Kalman filter.

4. The method of claim 1, wherein the adjusted data is formed by applying at least one of a linear adjustment value or a rotational adjustment value to the GNSS data, wherein the linear adjustment value is equal to the linear offset, and wherein the rotational adjustment value is equal to the rotational offset.

5. The method of claim 1, further comprising:
identifying fixed GNSS data, wherein the fixed GNSS data represents a fixed object within the GNSS data; and
identifying fixed radar data, wherein the fixed radar data represents the fixed object within the radar data,
wherein identifying an offset between the GNSS data and the radar data is accomplished by identifying an offset between the fixed GNSS data and the fixed radar data.

6. The method of claim 1, further comprising:
receiving an anchor position for the watercraft;
determining a navigational command based on the adjusted data; and
causing the navigational command to be applied to shift the watercraft towards the anchor position,
wherein the navigational command includes at least one of a steering command to rotate the watercraft or a thrust command to generate thrust at a motor of the watercraft.

7. The method of claim 1, wherein the adjusted data is formed repetitively as further radar data is received from the radar of the watercraft.

8. The method of claim 7, wherein the adjusted data is formed at least once every ten seconds.

9. The method of claim 8, wherein the adjusted data is formed at least once every five seconds.

10. The method of claim 9, wherein the adjusted data is formed at least once every second.

11. The method of claim 1, wherein the radar is a Doppler radar.

12. The method of claim 1, further comprising:
applying the second adjusted data by performing an automated docking operation with the second adjusted data.

13. A system for refining global navigation satellite system (GNSS) data for a watercraft, the system comprising:
a radar;
a global navigation satellite system (GNSS);
a processor; and
a memory including computer program code configured to, when executed, cause the processor to:
receive, from the GNSS, the GNSS data;
receive radar data from a radar mounted to the watercraft;
identify an offset between the GNSS data and the radar data, wherein the offset includes at least one of a linear offset between the GNSS data and the radar data or a rotational offset between the GNSS data and the radar data;
create adjusted data based on the identified offset;
receive additional GNSS data from the GNSS;
receive additional radar data from the radar;
identify a second offset between the additional GNSS data and the additional radar data, wherein the second offset includes at least one of a linear offset between the additional GNSS data and the additional radar data or a rotational offset between the additional GNSS data and the additional radar data; and
adjust the additional GNSS data based on the second offset to form second adjusted data,
wherein the additional GNSS data is received after the GNSS data, wherein the additional radar data is received after the radar data; and
apply the second adjusted data by taking an action, wherein the action comprises at least one of:
performing a docking operation with the second adjusted data;
automatically navigating the watercraft using the second adjusted data;
causing presentation of an alert or other indication regarding the second adjusted data; or
updating, using the second adjusted data, a chart to form an updated chart and causing presentation of the updated chart on a display.

14. The system of claim 13, wherein the adjusted data is created using a Kalman filter, with the GNSS data and the radar data used as inputs in the Kalman filter.

15. A non-transitory computer readable medium having stored thereon software instructions that, when executed by a processor, cause the processor to:
receive, from the global navigation satellite system (GNSS), the GNSS data;

receive radar data from a radar mounted to the watercraft;
identify an offset between the GNSS data and the radar data, wherein the offset includes at least one of a linear offset between the GNSS data and the radar data or a rotational offset between the GNSS data and the radar data;
create adjusted data based on the identified offset;
receive additional radar data from the radar;
identify a second offset between the GNSS data and the additional radar data, wherein the second offset includes at least one of a linear offset between the GNSS data and the additional radar data or a rotational offset between the GNSS data and the additional radar data; and
adjust the GNSS data based on the second offset to form second adjusted data,
wherein the additional radar data is received after the radar data; and
apply the second adjusted data by taking an action, wherein the action comprises at least one of:
performing a docking operation with the second adjusted data;
automatically navigating the watercraft using the second adjusted data;
causing presentation of an alert or other indication regarding the second adjusted data; or
updating, using the second adjusted data, a chart to form an updated chart and causing presentation of the updated chart on a display.

16. The non-transitory computer readable medium of claim 15, wherein the adjusted data is created using a Kalman filter, with the GNSS data and the radar data used as inputs in the Kalman filter.

* * * * *